United States Patent
Zwiegincew et al.

(10) Patent No.: US 11,416,239 B2
(45) Date of Patent: Aug. 16, 2022

(54) SYSTEM AND METHOD OF UTILIZING DATA BINDING TO PROPAGATE DATA CHANGES

(71) Applicant: Facebook Technologies, LLC, Menlo Park, CA (US)

(72) Inventors: Arthur Zwiegincew, Medina, CA (US); Gwen Erick Eng Mittertreiner, Mountain View, CA (US); Andrew William Keep, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/138,479

(22) Filed: Dec. 30, 2020

(65) Prior Publication Data
US 2022/0206778 A1   Jun. 30, 2022

(51) Int. Cl.
*G06F 9/445* (2018.01)
*G06F 8/65* (2018.01)
*G06F 16/11* (2019.01)

(52) U.S. Cl.
CPC .............. *G06F 8/65* (2013.01); *G06F 16/128* (2019.01)

(58) Field of Classification Search
CPC ................................. G06F 8/65; G06F 16/128
USPC ....................................................... 717/168
See application file for complete search history.

(56) References Cited

U.S. PATENT DOCUMENTS

2019/0377565 A1\* 12/2019 Murthy ................ G06F 21/554
2020/0159598 A1    5/2020 Yadav et al.

OTHER PUBLICATIONS

International Search Report and Written Opinion for International Application No. PCT/US2021/065180, dated Apr. 13, 2022, 10 pages.

\* cited by examiner

*Primary Examiner* — Chuck O Kendall
(74) *Attorney, Agent, or Firm* — Baker Botts L.L.P.

(57) ABSTRACT

In one embodiment, one or more computing systems executes a computer program defining (1) a bound value that references a bound variable and (2) a terminating bound value that references computation instructions for deriving a runtime value from at least the bound value of the bound variable. A computation orchestration layer of a programming framework initializes, according to the computer program, a subscription tracker that tracks subscription relationships between the bound variable and the terminating bound value. The computation orchestration layer uses, in response to receiving an indication of an update to the bound value of the bound variable, the subscription tracker to determine that the terminating bound value subscribes to updates to the bound value of the bound variable. The computation orchestration layer sends an update stream associated with the update to a callback function associated with the terminating bound value.

20 Claims, 6 Drawing Sheets

SYSTEM AND METHOD OF UTILIZING DATA BINDING TO PROPAGATE DATA CHANGES

TECHNICAL FIELD

This disclosure generally relates to a software framework.

BACKGROUND

In computer programming, a software framework is an abstraction in which software providing generic functionality can be selectively changed by additional user-written code, thus providing application-specific software. It provides a standard way to build and deploy applications and is a universal, reusable software environment that provides particular functionality as part of a larger software platform to facilitate the development of software applications, products and solutions. Software frameworks may include support programs, compilers, code libraries, toolsets, and application programming interfaces (APIs) that bring together all the different components to enable development of a project or system.

SUMMARY OF PARTICULAR EMBODIMENTS

Disclosed herein is an application framework that supports data binding. Goals of the disclosed application framework may be to make programming simpler, more efficient, and less error-prone. When a developer uses this data binding framework, the developer may simply declare that certain values are bound, and the framework would handle update propagations. For example, if a position of a window is bound to a user's mouse location at the time of a click event, the application model would automatically update the position of the window as the user's mouse location changes. From the developer's perspective, live/dynamic data can be treated just like static data, making programming simpler, more efficient, and less error-prone.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
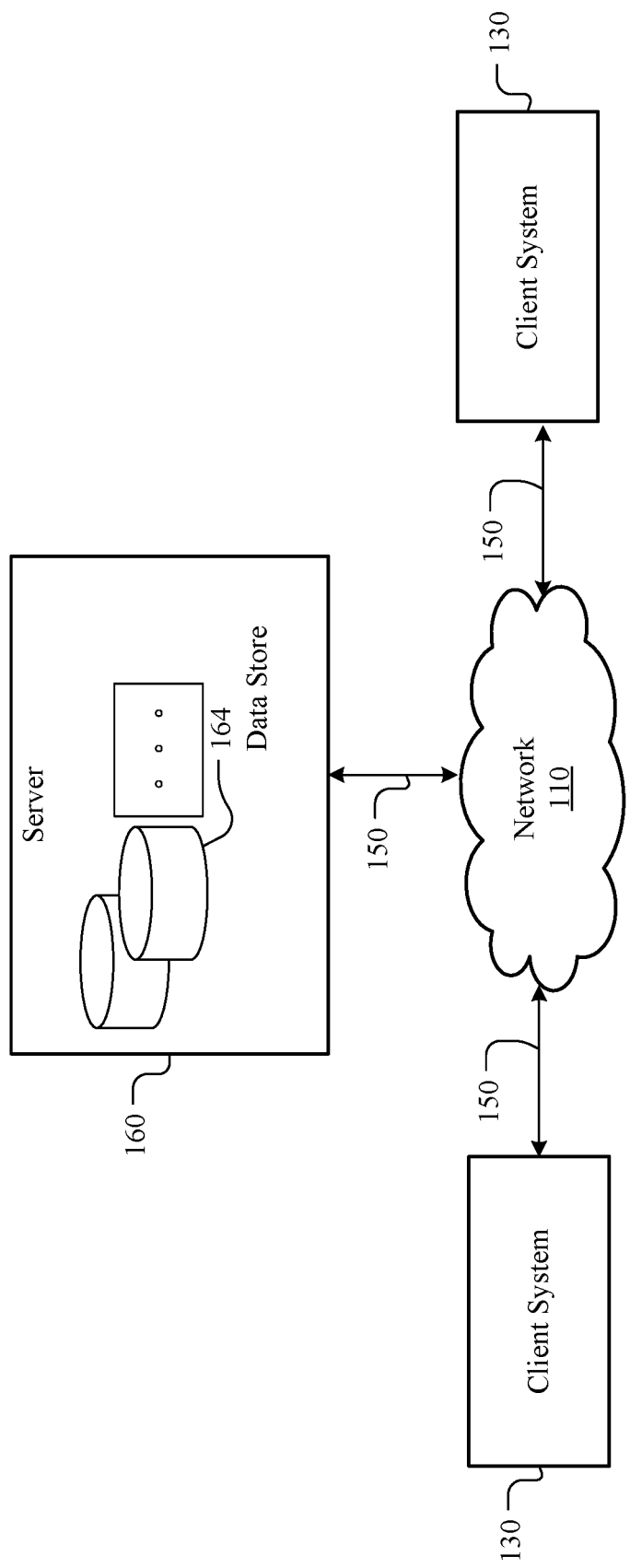
FIG. 1 illustrates an example network environment associated with a programming framework.

Applications developed by third-party developers may commonly have reactive features (e.g., if the user moves his mouse or changes a field, something would happen accordingly). Additionally, developers may traditionally have to manually build a handler for explicitly handling such changes, which can be time-consuming, error-prone, and un-optimized. To address those issues, an application framework that supports data binding may be used. When a developer uses this data binding framework, the developer may simply declare that certain values are bound, and the framework would handle update propagations. For example, if a position of a window is bound to a user's mouse location at the time of a click event, the application model would automatically update the position of the window as the user's mouse location changes. From the developer's perspective, live/dynamic data can be treated just like static data, making programming simpler, more efficient, and less error-prone.

In particular embodiments, the code of a software application may use bound values to reference bound variables. The bound values may be opaque lazy recipes of the current value of the bound variable. The bound variables may behave as ordinary variables locally, with mutation functions for changing the underlying values. The bound value may be a lazy abstraction, or a recipe, for obtaining snapshots and update streams. Bound values may track the versions of the bound variables and provide it to a requestor as a snapshot. In addition, a requestor may also request an update stream from the received snapshot, which allows the requestor to automatically receive updates. Bound values may track versions of bound variables via snapshots, and specific snapshots may be retrieved using corresponding snapshot version numbers.

In particular embodiments, the data binding framework may have several layers, including a computation declaration layer and a computation orchestration layer. The computation declaration layer may provide developers with implementations of bound variables, bound values, bound functions, and various pre-defined types of bound data models, such as scalars, maps, lists, etc. The computation declaration layer may also allow users to define custom types of bound values, which are referred to as bound transforms or bound functions. A bound transform may be a custom instance of a bound value abstraction having a specified type and custom implementation details for providing a snapshot and update stream. The computation declaration layer may operate on top of the computation orchestration layer, which may manage data subscriptions between the bound values/transforms/functions and the underlying data stream. In addition, the computation orchestration layer may support snapshots and update streams of bound values. When the user code is compiled, the subscription relationships and snapshot utilization can be reasoned on and the resulting data structures and data flow could be optimized accordingly.

In particular embodiments, a user's code may use the computation declaration layer to specify how live data is to be consumed (e.g., how a particular value stored in a bound map data structure is to be displayed). When the code is compiled, the compiler may optimize the runtime logic to make the data-binding data flow more efficient. This may manifest in the computation orchestration layer instantiating more efficient data subscriptions and usage of data structures to support, e.g., snapshots (e.g., if the user code does not make use of the different snapshots of a bound value, no complex data structure would be instantiated to track different data versions). At runtime, when the underlying data stream updates a bound value, the computation orchestration layer may identify all the subscribers and trigger their callback functions defined within the computation declaration layer. Those callback functions may specify the logic for handling updates to the bound value. As an example and not by way of limitation, the callback function of a bound function for summation may request for the latest snapshot and the snapshot's mutation update stream. A mutation update stream may provide a history of incremental value changes, which allows the callback function to incrementally compute the updated summation value. As an example and not by way of limitation, if the current summation value is the sum of 1M numbers, normally the change in a single number would require a re-computation of the sum or an explicit "diff" operation between the underlying 1M numbers to find what has changed. Here, however, the mutation update stream may provide a tracked history of what has changed since the last snapshot (e.g., values deleted or added). Thus, the summation callback function could easily recompute the summation value in response to a changed number by, e.g., subtracting the previous value of the number from the current sum and adding the new value of the number (e.g., if the previous sum is 2,273,222 and one of the 1M numbers changed from 3 to 2, the new sum could be computed by: 2,273,222−3+2).

In particular embodiments, each of the bound values may correspond to a data stream that provides information to functions that may be subscribed to the data stream. As an example, the bound value may be defined as a variable "X". When the variable X is used in functions, the function may be determined to be subscribed to the data stream corresponding to the variable X The computation orchestration layer may generate a mapping between the bound values and the subscribers to the data stream. That is, the computation orchestration layer may determine which functions may need to subscribe to a particular data stream and which functions need to be propagated the changes to the respective data stream. This mapping may be a subscriber tree. Therefore, if a function includes a bound value X, such as X+Y=Z, and Z is used in a different function, then the computation orchestration layer may also add functions that include the value Z as a subscriber to the data stream of the bound value X The computation orchestration layer may also perform an optimization to reduce unnecessary data structures. The stream library may comprise the data streams that functions subscribe to. When a data stream is updated, the stream library may propagate the data change to the necessary functions. By using bound values, the data changes may be propagated without errors.

In particular embodiments, one or more computing systems may use a data binding framework. In particular embodiments, the data binding framework may be a programming framework. In particular embodiments, the one or more computing systems may execute a computer program defining a bound variable that a bound value may reference. The computer program may also define a terminating bound value that references computation instructions for deriving a runtime value from at least the bound value of the bound variable. In particular embodiments, the bound value may be one of a plurality of data types. As an example and not by way of limitation, the data types may include one or more of a scalar, struct, enum, option, set, ordered set, map, multimap, ordered map, ordered multimap, list, indexed set, bound transform, bound composition, or any valid combination of these constructs. Although this disclosure contemplates implementing a data binding framework in a particular manner, this disclosure also contemplates implementing a data binding framework in any suitable manner.

In particular embodiments, the one or more computing systems may use a computation orchestration layer of a programming framework to perform one or more functions. While this disclosure may describe functions being performed by a computation orchestration layer, the functions may also be performed by a computation declaration layer. In particular embodiments, the computation orchestration layer of a programming framework may initialize, according to the computer program, a subscription tracker that tracks subscription relationships between the bound variable and the terminating bound value. In particular embodiments, the subscription tracker may use a computation declaration layer to identify the subscription relationships between the bound variable and the terminating bound value. Although this disclosure contemplates initializing a subscription tracker in a particular manner, this disclosure also contemplates initializing a subscription tracker in any suitable manner.

In particular embodiments, the computation orchestration layer of a programming framework may receive an indication of an update to a bound value of a bound variable. In particular embodiments, in response to receiving an indication of an update, the computation orchestration layer may use the subscription tracker to determine one or more subscribers of updates to the bound value of the bound variable. As an example and not by way of limitation, the computation orchestration layer may use a subscription tracker to determine that a terminating bound value subscribes to updates to the bound value of the bound variable. Although this disclosure contemplates receiving an indication of an update in a particular manner, this disclosure contemplates receiving an indication of an update in any suitable manner.

In particular embodiments, the computation orchestration layer of a programming framework may send an update stream associated with the update to a callback function associated with the terminating bound value. In particular embodiments, the update stream may be one of an invalidation update stream, a mutation update stream, a mutations-with-previous update stream, or another type of stream. In particular embodiments, an invalidation update stream may provide information to a subscriber (of the bound value corresponding to the update stream) that a previous value of a bound value is old/invalid. The information that the previous value of a bound value is invalid may notify the subscriber to retrieve the new current value of a bound value. In particular embodiments, a mutation update stream may provide information that a previous value of a bound value is invalid and/or the new updated value of a bound value so that the subscriber does not need to retrieve the new updated value of the bound value separately. In particular embodiments, a mutation-with-previous update stream may provide similar information as a mutation update stream but also include a previous value of the bound value. In particular embodiments, the update stream may be based on a data type associated with the bound value. In particular embodiments, each message of an update stream may comprise a snapshot identifier corresponding to the update. In particular embodiments, the update stream may comprise a message buffer that folds new updates into one or more unprocessed updates. In particular embodiments, the computation orchestration layer may process the update stream to compile the new updates with one or more unprocessed updates. In particular embodiments, the update stream may be terminated by a source of an update stream. In particular embodiments, the termination of the update stream may require a reset by a new snapshot identifier of the bound value. Although this disclosure contemplates sending an update stream in a particular manner, this disclosure contemplates sending an update stream in any suitable manner.

In particular embodiments, the one or more computing systems may compute the runtime value associated with the terminating bound value. In particular embodiments, the one or more computing systems may use the update stream to compute a runtime value associated with a terminating bound value according to computation instructions. In particular embodiments, computing the runtime value comprises retrieving a particular snapshot identifier of the bound value. In particular embodiments, the retrieval of the particular snapshot identifier may fail in response to determining the particular snapshot identifier is unavailable. In particular embodiments, the computation orchestration layer may perform a local reset and initiate a new snapshot identifier for the bound value. As an example and not by way of limitation, the computation orchestration layer may, in response to determining that a particular snapshot identifier is unavailable for a bound value, perform the local reset and initiate a new snapshot identifier for the bound value. Although this disclosure contemplates computing a runtime value in a particular manner, this disclosure contemplates computing a runtime value in any suitable manner.

In particular embodiments, the computation orchestration layer may initialize a snapshot tracker for tracking a history of values of a bound value. In particular embodiments, the history of values of a bound value may be stored in a database associated with the computation orchestration layer. In particular embodiments, in response to receiving an indication of an update to the bound value of the bound variable, the computation orchestration layer may add the update to the bound value to the snapshot tracker and index the added update to the bound value using a snapshot identifier. As an example and not by way of limitation, a previous runtime value of a bound value may be captured by a first snapshot identifier, and an updated runtime value of a bound value may be captured by a second snapshot identifier. Although this disclosure contemplates initializing a snapshot tracker in a particular manner, this disclosure contemplates initializing a snapshot tracker in any suitable manner.

FIG. 1 illustrates an example network environment 100 associated with a programming framework. Network environment may include client systems 130 and a server 160 connected to each other by a network 110. Although FIG. 1 illustrates a particular arrangement of client systems 130, server 160, and a network 110, this disclosure contemplates any suitable arrangement of client systems 130, server 160, and network 110. As an example and not by way of limitation, two or more of client systems 130 and/or server 160 may be connected to each other directly bypassing a network 110. As another example, two or more of client systems 130 and server 160 may be physically or logically co-located with each other in whole or in part. Moreover, although FIG. 1 illustrates a particular number of client systems 130, servers 160, and networks, this disclosure contemplates any suitable number of client systems 130, servers 160, and networks 110. As an example and not by way of limitation, network environment 100 may include multiple client systems 130, servers 160, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130 and a server 160 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130. A client system 130 may enable its user to communicate with a website hosted by a server 160.

In particular embodiments, the server 160 may be a network-addressable computing system that can host a website. As an example and not by way of limitation, the server 160 may host an online social network. The server 160 may be accessed by the other components of network environment 100 either directly or via a network 110. As an example and not by way of limitation, a client system 130 may access the server 160 using a web browser, or a native application associated with the server 160 (e.g., a mobile social-networking application, a messaging application, another suitable application, or any combination thereof) either directly or via a network 110. In particular embodiments, the server 160 may be a unitary server or a distributed server spanning multiple computers or multiple datacenters. Server 160 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 160 may include hardware, software, or embedded logic components or a combination of two or more such components for carrying out the appropriate functionalities implemented or supported by server 160. In particular embodiments, the server 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130 or a server 160 to manage, retrieve, modify, add, or delete, the information stored in data store 164. In particular embodiments, the server 160 may include a database (e.g., data store 164) associated with a programming framework. As an example and not by way of limitation, the server 160 may include a database containing a snapshot tracker and a snapshot database as described herein.

In particular embodiments, the network environment 100 illustrates how updates of a programming framework may be sent to subscribers of bound values. As an example and not by way of limitation, if a first client system 130 makes an update to a bound variable, the update may be sent to a computation orchestration layer that identifies subscribers to the bound value associated with the bound variable. An update stream may be sent to each of the subscribers which may be associated with other client systems 130 or the server 160.

Figure 2:
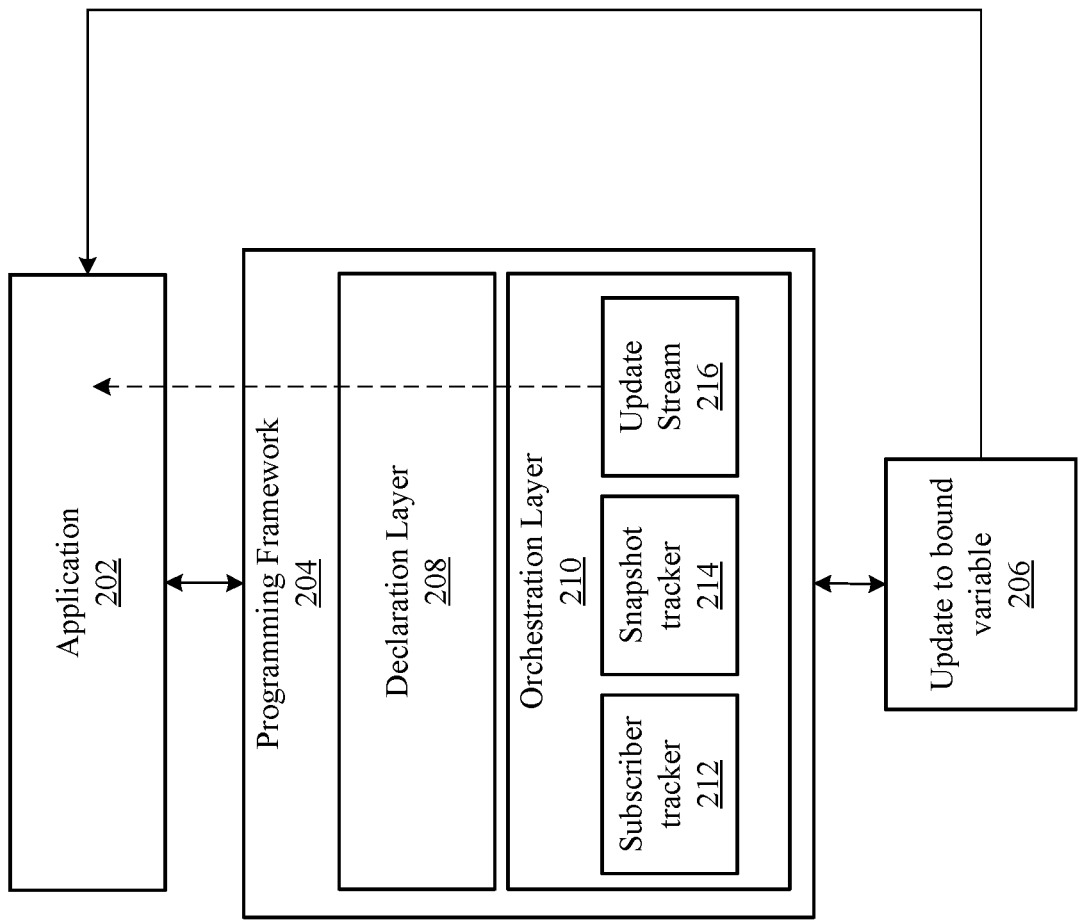
FIG. 2 illustrates an example environment associated with a programming framework.

Referring to FIG. 2, an example of an environment 200 associated with a programming framework is shown. The environment 200 associated with the programming framework may comprise an application 202, a programming framework 204, and an update to bound variable 206. In particular embodiments, the application 202 may be written with user code that includes a bound variable associated with the programming framework 204. In particular embodiments, when a bound variable used by the application 202 is updated, the application 202 may be sent an update to the bound variable 206. In particular embodiments, the update to the bound variable 206 may initiate an update request by the application 202. In particular embodiments, the application 202 may be sent an update to the bound variable 206 as an invalidation update stream. In particular embodiments, the invalidation update stream may trigger an invalidation of a bound variable used by the application 202. The invalidation of the bound variable used by the application 202 may initiate a request for an update to the bound value associated with the bound variable. The application 202 may request an update to the bound value associated with the bound variable from the programming framework 204.

In particular embodiments, the programming framework 204 may be the programming language used to code the application 202. In particular embodiments, a library may be associated with the programming framework 204. In particular embodiments, the programming framework 204 may include a declaration layer 208 and an orchestration layer 210. In particular embodiments, the orchestration layer 210 may include a subscriber tracker 212, a snapshot tracker 214, and an update stream 216. In particular embodiments, the declaration layer 208 may be used to define custom types of bound values, which are referred to as bound transforms or bound functions. The declaration layer 208 may identify the subscription relationships between bound variables and bound values. The subscription relationships may be used by the orchestration layer 210 to generate a subscriber tree that is used by the subscriber tracker 212. The subscriber tracker 212 may be a mapping between bound variables and one or more bound values associated with the respective bound variables. In particular embodiments, as bound values are updated, a snapshot identifier may be assigned to each update to track a history of values of the corresponding bound value. As an example and not by way of limitation, for a bound value X, when the bound value X=5, the value 5 may be given a first snapshot identifier. Continuing the example, when the bound variable associated with the bound value X is updated so that the bound value X=4, then the value 4 may be given a second snapshot identifier. The history of values of bound values may be captured and stored by the snapshot tracker 214. The snapshot tracker 214 may index any added updates to the bound value using a snapshot identifier. In particular embodiments, when a bound variable is updated, then an update stream 216 may be requested by the corresponding subscribers to the bound variable and subsequently sent to the corresponding subscribers to the bound variable. The update stream 216 may be requested and subsequently sent to other parts of the programming framework (e.g., snapshot tracker 214) to update bound values subscribed to an updated bound variable. In particular embodiments, the update stream 216 may be automatically requested by a subscriber. As an example and not by way of limitation, if a subscriber requested an update stream for a bound value Z, where Z=X+Y, then an update stream for both X and Y may automatically be requested. The orchestration layer 210 may identify the corresponding subscribers to a bound variable to send update streams that have requested the update streams. In particular embodiments, the orchestration layer 210 may determine an optimal update stream to send to a subscriber. As an example and not by way of limitation, if a bound variable is updated, but the bound value would not change as a result of the update, then the orchestration layer 210 may determine to not send an update stream to a corresponding subscriber (e.g., subscriber of the bound value that would not change). In particular embodiments, the update stream 216 may include a snapshot identifier corresponding to an update as described herein. In particular embodiments, the update stream 216 may be sent to the application 202 to compute a runtime value associated with a terminating bound value according to computation instructions. In particular embodiments, the programming framework 204 may send an update to a bound variable 206 notification to subscribers. As an example and not by way of limitation, the programming framework 204 may send an update to a bound variable 206 to the application 202.

Figure 3:
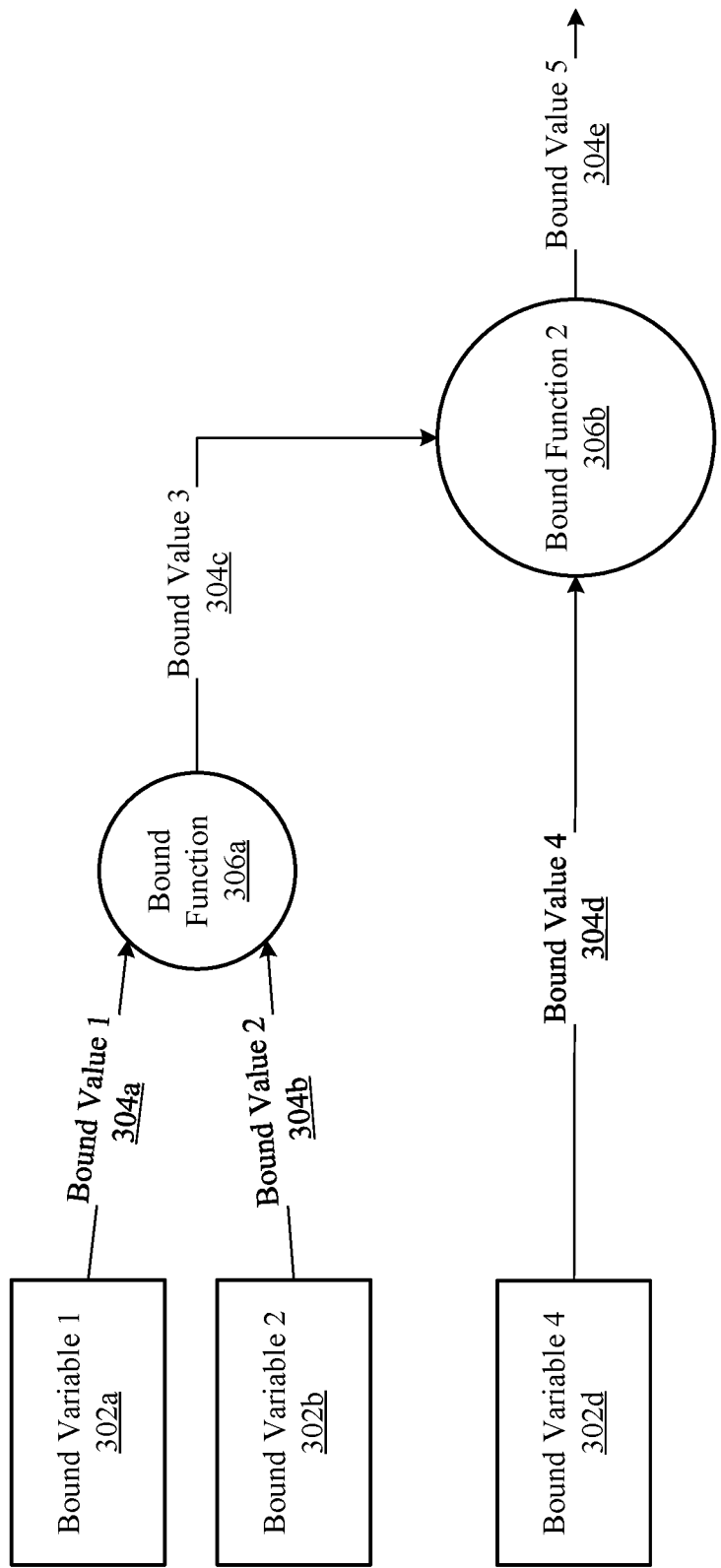
FIG. 3 illustrates a diagram flow of a subscriber tree of several bound variables.

Referring to FIG. 3, a diagram flow of a subscriber tree 300 of several bound variables is shown. The subscriber tree 300 includes a plurality of bound variables 1, 2, 4, 302a, 302b, 302d, a plurality of bound values 1-5 304a-304e, and a plurality of bound functions 306a-306b. In particular embodiments, each bound variable 1, 2, 4 302a, 302b, 302d may be associated with a corresponding bound value 1, 2, 4 304a, 304b, 304d. There may be a bound value 3 304c and bound value 5 304e associated with bound function 1 306a and bound function 2 306b, respectively. To compute the real-time value of the bound function 306a, a computing system may retrieve a particular snapshot identifier of bound values 1-2 304a-304b to compute the bound function 306a based on computation instructions. For instance, the bound function 306a may request the latest snapshot identifier of bound values 1-2 304a-304b. In particular embodiments, bound value 1 304a, bound function 1 306a, bound value 3 304c, bound function 2 306b, and bound value 5 304e are all subscribers to bound variable 1 302a. Therefore, whenever there is an update to bound variable 1 302a, each of the subscribers will receive an update via their update streams based on the update to the variable. In particular embodiments, bound value 2 304b, bound function 1 306a, bound value 3 304c, bound function 2 306b, and bound value 5 304e are all subscribers to bound variable 2 302b. In particular embodiments, bound value 4 304d, bound function 2 306b, and bound value 5 304e may be subscribers to bound variable 4 302d. An orchestration layer of a programming framework may determine whether to send update streams to the subscribers that have requested the update streams based on an optimization of the update streams. As an example and not by way of limitation, if the orchestration layer determines from a latest snapshot identifier that bound value 2 304b is equal to 0, then any update to bound variable 1 302a may be ignored if the bound function 306a is a multiplication function. The orchestration layer may identify the unique relationships between bound variables 302, bound values 304, and bound functions 306 and use snapshot identifiers of the bound values 304 to optimize the update streams. In particular embodiments, the bound value may be a plurality of data types including one or more of a scalar, struct, enum, option, set, ordered set, map, multimap, ordered map, ordered multimap, list, indexed set, or data set.

Figure 4B:
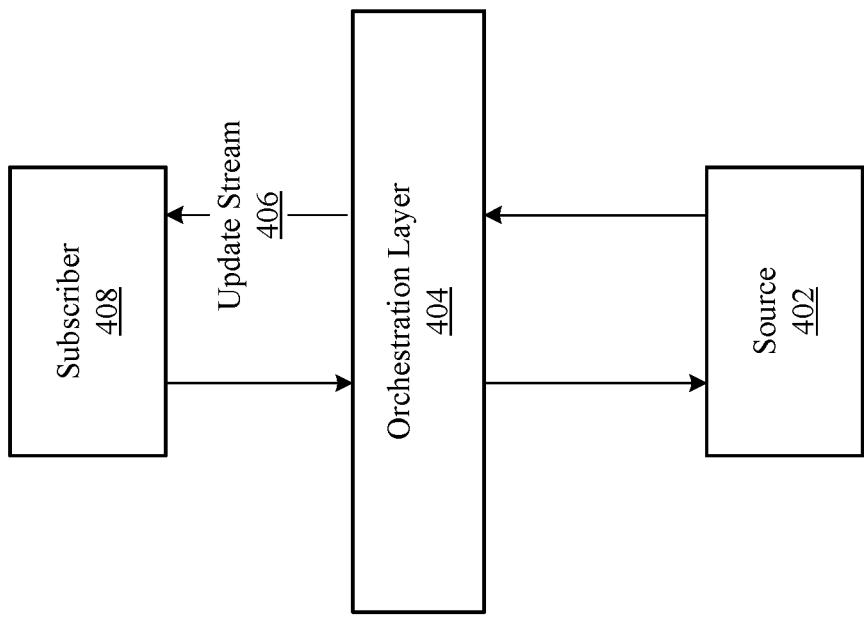
FIG. 4B illustrates a diagram flow of a pull process of updating a bound variable.
Figure 4A:
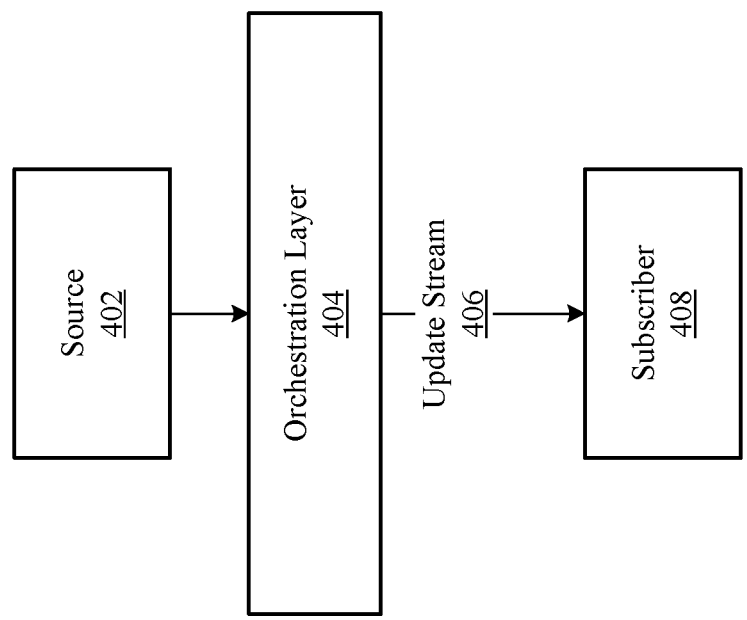
FIG. 4A illustrates a diagram flow of a push process of updating a bound variable.

Referring to FIG. 4A, a diagram flow of a push process 400a of updating a bound variable is shown. In particular embodiments, a source 402 may initially receive an update to a bound variable. The source 402 may send the update to the bound variable to the orchestration layer 404 of a programming framework. The orchestration layer 404 may use a subscriber tracker to identify subscribers to the bound variable that is being updated. The orchestration layer 404 may identify a subscriber 408 out of a plurality of subscribers to the bound variable. The orchestration layer 404 may send an update stream 406 to the subscriber 408. The update stream 406 may comprise a snapshot identifier based on the computation instructions of the subscriber 408. As an example and not by way of limitation, if the subscriber 408 is a bound function, the bound function may specify that it needs the latest snapshot identifier of a bound value associated with the bound variable. The orchestration layer 404 may send the snapshot identifier needed by the subscriber 408 in the update stream 406 to the subscriber 408. In particular embodiments, the update stream 406 to the subscriber 408 may be an invalidation update stream. As an example and not by way of limitation, the update stream 406 may contain the latest snapshot identifier for a bound value. When the subscriber 408 receives the update stream 406 containing the latest snapshot identifier, the latest snapshot identifier may invalidate a previous snapshot identifier used to compute a run-time value of a bound value. The subscriber 408 may then request an update stream 406 from the orchestration layer 404 to compute the run-time value associated with the subscriber 408.

Referring to FIG. 4B, a diagram flow of a pull process 400b of updating a bound variable is shown. In particular embodiments, a subscriber 408 may initially request an update to a bound variable from the orchestration layer 404. The orchestration layer 404 may receive the request for an update for a bound variable and identify the source 402 associated with the bound variable. The orchestration layer 404 may send a request for an update for the bound variable to the source 402. The source 402 may send the latest value of the bound variable to the orchestration layer 404. The orchestration layer 404 may determine whether the bound variable has changed. If the bound variable has changed and is updated, then the orchestration layer 404 may record the update and send a corresponding update stream 406 to the subscriber 408 including a snapshot identifier for the bound value corresponding to the bound variable the subscriber 408 is subscribed.

Figure 5:
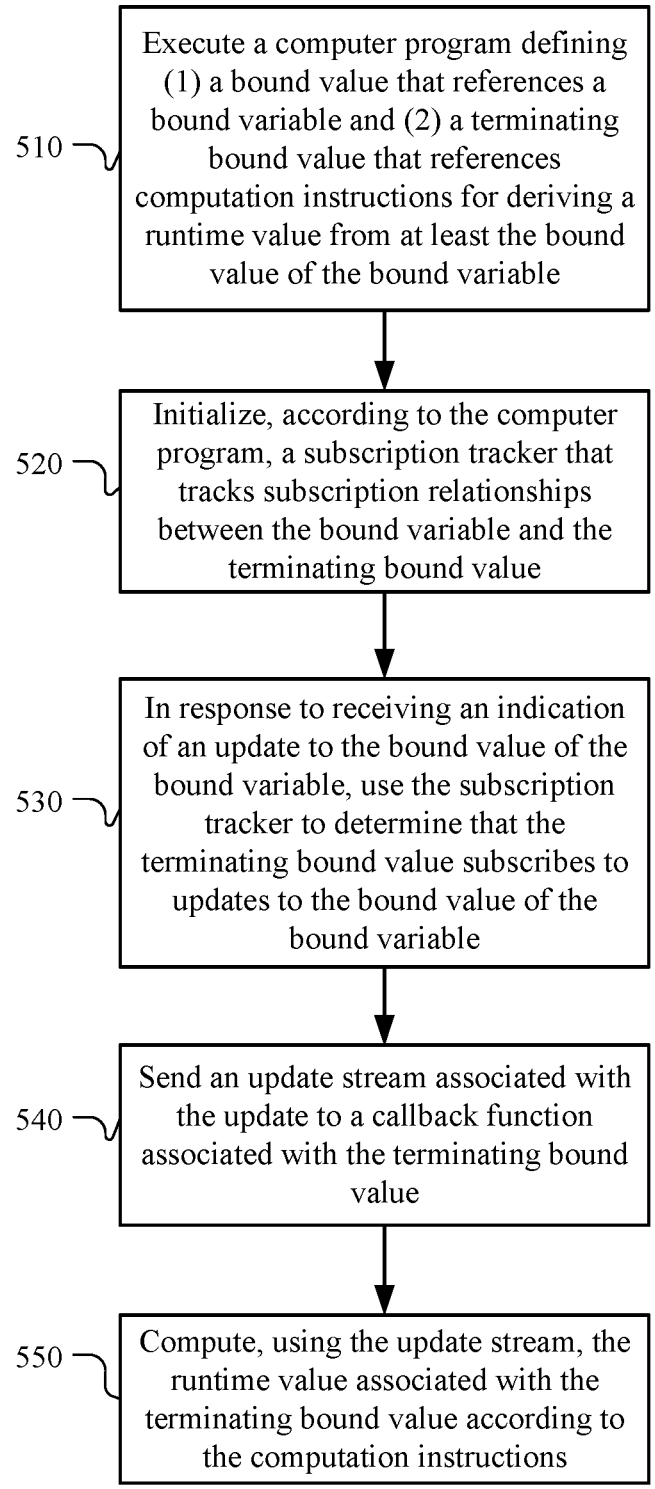
FIG. 5 illustrates an example method for utilizing data binding to propagate data changes.

FIG. 5 illustrates an example method 500 for utilizing data binding to propagate data changes. The method may begin at step 510, where one or more computing systems may execute a computer program defining (1) a bound value that references a bound variable and (2) a terminating bound value that references computation instructions for deriving a runtime value from at least the bound value of the bound variable. At step 520, the one or more computing systems may use a computation orchestration layer of a programming framework to initialize, according to the computer program, a subscription tracker that tracks subscription relationships between the bound variable and the terminating bound value. At step 530, the one or more computing systems may use the computation orchestration layer to, in response to receiving an indication of an update to the bound value of the bound variable, use the subscription tracker to determine that the terminating bound value subscribes to updates to the bound value of the bound variable. At step 540, the one or more computing systems may use the computation orchestration layer to send an update stream associated with the update to a callback function associated with the terminating bound value. At step 550, the one or more computing systems may compute, using the update stream, the runtime value associated with the terminating bound value according to the computation instructions. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for utilizing data binding to propagate data changes, including the particular steps of the method of FIG. 5, this disclosure contemplates any suitable method of utilizing data binding to propagate data changes, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
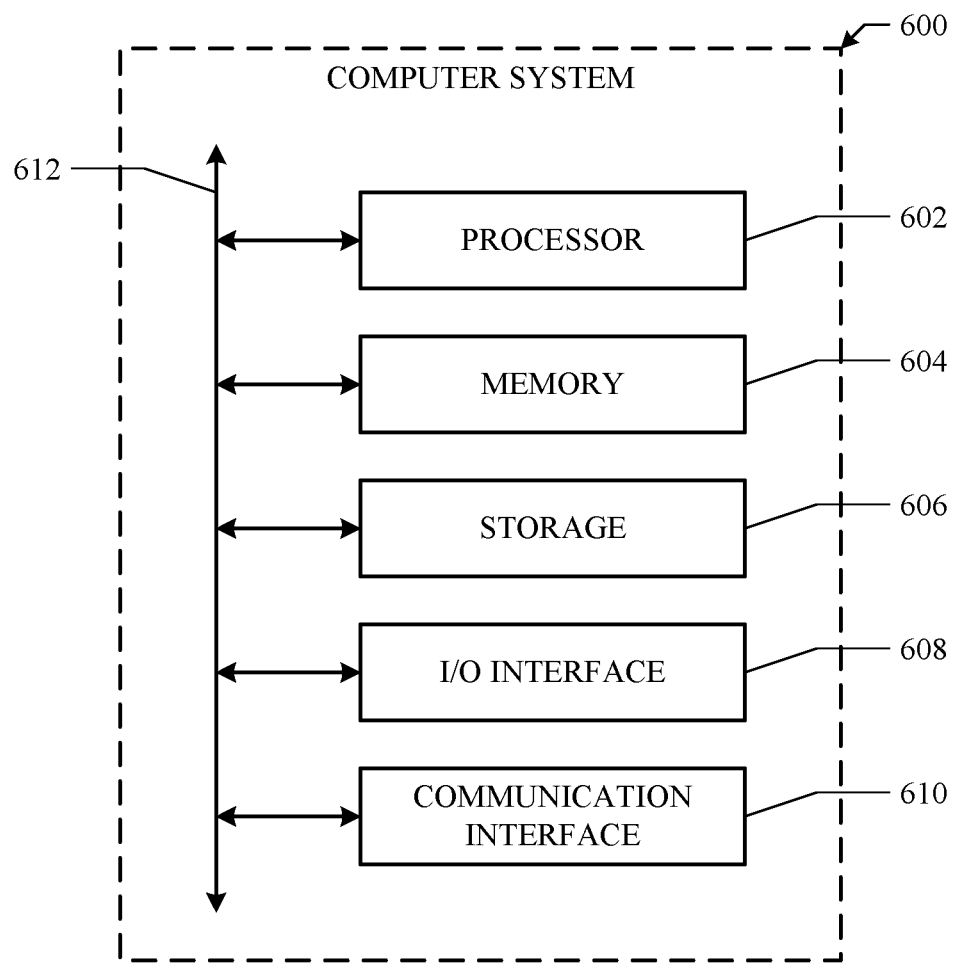
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

[44] Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

executing a computer program defining (1) a bound value that references a bound variable and (2) a terminating bound value that references computation instructions for deriving a runtime value from at least the bound value of the bound variable;

by a computation orchestration layer of a programming framework:

initializing, according to the computer program, a subscription tracker that tracks subscription relationships between the bound variable and the terminating bound value;

in response to receiving an indication of an update to the bound value of the bound variable, using the subscription tracker to determine that the terminating bound value subscribes to updates to the bound value of the bound variable;

sending an update stream associated with the update to a callback function associated with the terminating bound value; and computing, using the update stream, the runtime value associated with the terminating bound value according to the computation instructions.

2. The method of claim 1, further comprising, by the computation orchestration layer:

initializing a snapshot tracker for tracking a history of values of the bound value; and in response to receiving the indication of an update to the bound value of the bound variable, adding to the snapshot tracker the update to the bound value and indexing the added update to the bound value using a snapshot identifier.

3. The method of claim 2, wherein computing the runtime value comprises retrieving a particular snapshot identifier.

4. The method of claim 3, wherein retrieval of the particular snapshot identifier fails in response to determining the particular snapshot identifier is unavailable.

5. The method of claim 4, further comprising, by the computation orchestration layer:

performing a local reset and initiating a new snapshot identifier for the bound value.

6. The method of claim 1, wherein the bound value is one of a plurality of data types, and wherein the plurality of data types comprises one or more of a scalar, struct, enum, option, set, ordered set, map, multimap, ordered map, ordered multimap, list, indexed set, bound transform, bound composition, or data set.

7. The method of claim 1, wherein the update stream is one of an invalidation update stream, a mutation update stream, or a mutations-with-previous update stream, and wherein the update stream is based on a data type associated with the bound value.

8. The method of claim 1, wherein each message of the update stream comprises a snapshot identifier corresponding to the update.

9. The method of claim 1, wherein the update stream comprises a message buffer that fold new updates into one or more unprocessed updates.

10. The method of claim 1, wherein the update stream is terminated by a source of the update stream, wherein termination of the update stream requires a reset by a new snapshot identifier.

11. The method of claim 1, wherein the subscription tracker uses a computation declaration layer to identify the subscription relationships between the bound variable and the terminating bound value.

12. One or more computer-readable non-transitory storage media embodying software that is operable when executed to:

execute a computer program defining (1) a bound value that references a bound variable and (2) a terminating bound value that references computation instructions for deriving a runtime value from at least the bound value of the bound variable;

initialize, by a computation orchestration layer of a programming framework according to the computer program, a subscription tracker that tracks subscription relationships between the bound variable and the terminating bound value;

use, by the computation orchestration layer of the programming framework in response to receiving an indication of an update to the bound value of the bound variable, the subscription tracker to determine that the terminating bound value subscribes to updates to the bound value of the bound variable;

send, by the computation orchestration layer of the programming framework, an update stream associated with the update to a callback function associated with the terminating bound value; and compute, using the update stream, the runtime value associated with the terminating bound value according to the computation instructions.

13. The media of claim 12, wherein the one or more computer-readable non-transitory storage media is further operable when executed to:

initialize, by the computation orchestration layer a snapshot tracker for tracking a history of values of the bound value; and add, by the computation orchestration layer in response to receiving the indication of an update to the bound value of the bound variable, to the snapshot tracker the update to the bound value and indexing the added update to the bound value using a snapshot identifier.

14. The media of claim 13, wherein computing the runtime value comprises retrieving a particular snapshot identifier.

15. The media of claim 14, wherein retrieval of the particular snapshot identifier fails in response to determining the particular snapshot identifier is unavailable.

16. The media of claim 15, wherein the one or more computer-readable non-transitory storage media is further operable when executed to:

perform, by the computation orchestration layer, a local reset and initiate a new snapshot identifier for the bound value.

17. A system comprising:

one or more processors; and one or more computer-readable non-transitory storage media coupled to one or more of the processors and comprising instructions operable when executed by one or more of the processors to cause the system to:

execute a computer program defining (1) a bound value that references a bound variable and (2) a terminating bound value that references computation instructions for deriving a runtime value from at least the bound value of the bound variable;

initialize, by a computation orchestration layer of a programming framework according to the computer program, a subscription tracker that tracks subscription relationships between the bound variable and the terminating bound value;

use, by the computation orchestration layer of the programming framework in response to receiving an indication of an update to the bound value of the bound variable, the subscription tracker to determine that the terminating bound value subscribes to updates to the bound value of the bound variable;

send, by the computation orchestration layer of the programming framework, an update stream associated with the update to a callback function associated with the terminating bound value; and compute, using the update stream, the runtime value associated with the terminating bound value according to the computation instructions.

18. The system of claim 17, wherein the instructions are further executable by the one or more processors to:

initialize, by the computation orchestration layer a snapshot tracker for tracking a history of values of the bound value; and add, by the computation orchestration layer in response to receiving the indication of an update to the bound value of the bound variable, to the snapshot tracker the update to the bound value and indexing the added update to the bound value using a snapshot identifier.

19. The system of claim 18, wherein computing the runtime value comprises retrieving a particular snapshot identifier.

20. The system of claim 19, wherein retrieval of the particular snapshot identifier fails in response to determining the particular snapshot identifier is unavailable.

\* \* \* \* \*